Jan. 16, 1968    A. B. SIMPKINS ET AL    3,363,450
PROBE FOR TESTING CABLES FOR LEAKS
Filed July 26, 1965
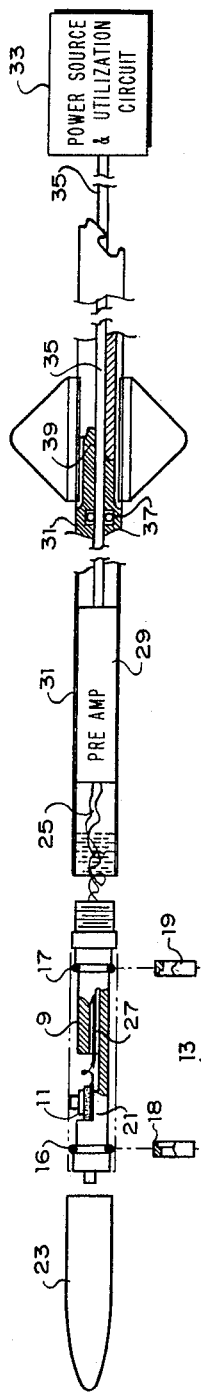
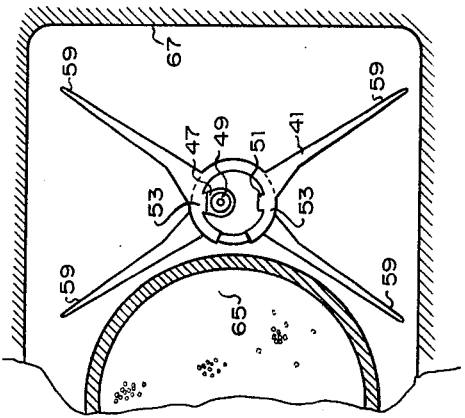
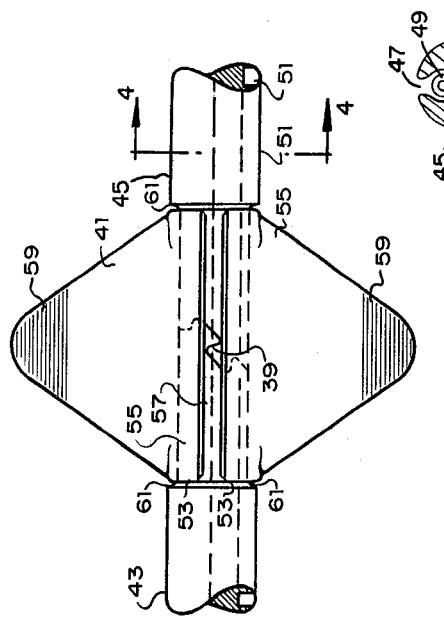
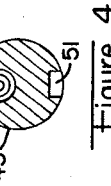
INVENTORS
CLYDE R. STEWART
ALAN B. SIMPKINS
BY  A. C. Smith
ATTORNEY

United States Patent Office 3,363,450
Patented Jan. 16, 1968

3,363,450
PROBE FOR TESTING CABLES FOR LEAKS
Alan B. Simpkins, Los Altos, and Clyde R. Stewart, Palo Alto, Calif., assignors to Hewlett-Packard Company, Palo Alto, Calif., a corporation of California
Filed July 26, 1965, Ser. No. 474,790
2 Claims. (Cl. 73—40.5)

ABSTRACT OF THE DISCLOSURE

A cylindrical diaphragm surrounds and seals an ultrasonic transducer against environmental conditions and provides omnidirectional sensitivity to ultrasonic vibrations. The transducer may be attached to interlocking extension sections for convenient insertion into a cable duct or the like.

---

The present invention relates to an ultrasonic probe for detecting gas leaks in cables and more particularly to apparatus for locating a leak in a pressurized cable within an elongated duct.

Certain known cable duct probes detect audible sound of pressurized gas escaping through a leak in the covering sheath of a cable within a duct. Such probes include a microphone disposed within a perforated shield attached to the end of one or more connectable rods and are described in the literature (see U.S. Patent 3,168,824). One disadvantage encountered in using a probe of this type is that silt and moisture which accumulates in cable ducts penetrates through the perforated shield and alters the operating characteristics of the microphone or renders it inoperative. Also the sections of rod having electrical connectors at each end alter the electrical length of the signal path between the microphone and the test instrument which responds to the signals from the microphone.

Accordingly, it is an object of the present invention to provide an ultrasonic probe for detecting gas leaks within elongated ducts.

It is another object of the present invention to provide an improved ultrasonic gas leak probe.

It is still another object of the present invention to provide an improved joint for attachable rods which carry and protect a fixed length of signal-carrying conductor connected between the probe and the test instrument.

In accordance with the illustrated embodiment of the present invention, an ultrasonic transducer is disposed within a probe tip and includes an omnidirectionally sensitive cylindrical diaphragm which also forms a portion of the cylindrical walls of the probe body. This protects the transducer from silt and moisture that may be present in a cable duct. The diameter of the cylindrical diaphragm is slightly smaller than the diameter of the probe at both ends of the diaphragm to avoid contact with the walls of the duct and the like. The probe is inserted into a cable duct at the end of an inserter rod comprising one or more attachable sections. The section joints are locked together by a resilient spacer clip which also serves to center the probe and inserter rod in the available space around the cable within a duct. A fixed length of coaxial line is attached to the probe and to a test instrument and is carried in a continuous groove formed in the sections of the inserter rod attached to the probe.

Other and incidental objects of the present invention will be apparent from a reading of this specification and an inspection of the accompanying drawing in which:

FIGURE 1 is a partial sectional view of the probe assembly and inserter rod;

FIGURE 2 is a side view of an assembled pair of inserter rod sections showing the resilient spacer clip in place;

FIGURE 3 is a sectional view of the probe and inserter rod in position within a cable duct; and FIGURE 4 is a cross-sectional view of the inserter rod of FIGURE 2.

Referring now to FIGURE 1, there is shown a probe body 9 having an ultrasonic transducer 11 such as a crystal of barium titanate or the like disposed in a recess 13 in the body. A cylindrical diaphragm 15 for 360° directional response is mounted at its ends on O-rings 16, 17 and acoustical isolation spacers 18, 19 disposed on opposite sides of the recess 13 in body 9. The region of the diaphragm of reduced wall thickness is held in acoustic contact with the ultrasonic transducer 11 by the resilient mounting pad 21 beneath the transducer 11. A tapered probe tip 23 is attached to the end of the probe body 9 to facilitate inserting the probe into a cable duct. Ultrasonic noise associated with the escape of pressurized gas from a leak in a pressurized cable excites the diaphragm 15 and transducer 11 to produce electrical signals, typically having maximum power density in the frequency range from 38 to 43 kilocycles.

A pair of conductors 25 attached to the ultrasonic transducer 11 are brought out through a hole 27 in the probe body. These conductors are connected to a preamplifier 29 which is disposed within a hollow shield 31 attached to the probe body 9 at the end thereof remote from the probe tip 23. Bias power for the preamplifier is supplied from the power source and utilization circuit 33 over the conductors of a fixed length of coaxial line 35. The preamplifier 29 amplifies the ultrasonic signal from the transducer 11 and sends it out at high level over the coaxial line 35 to the utiliziation circuit 33. The fixed length of coaxial line provides a fixed load for the preamplifier 29 and hence produces a fixed amount of signal attenuation. Also the fixed line eliminates the need for cable connectors at the mating ends of sections of the inserter rod, which connectors are subject to electrical and mechanical failure in the presence of moisture and silt in a cable duct. The coaxial line is also sealed into the preamplifier shield 31 by a suitable gasket 37 so that the probe as assembled hermetically seals in the transducer 11 and preamplifier 29 against contaminants that may be present in a cable duct. However, since the diaphragm of the transducer forms an outer wall of the enclosing probe assembly, there is no loss of sensitivity to ultrasonic noise.

Joints 39 between sections of the inserter rod include mating sections of a dovetail or other interlocking design which slide together in a direction transverse to the longitudinal axis of the inserter rod. The ends of the rod sections are held in axial alignment by a spacer clip 41, as shown in detail in FIGURE 2. The rod sections 43 and 45 have at least one longitudinal groove 47, as shown in cross section in FIGURE 4, for receiving the coaxial signal and bias line 49 below the cylindrical walls of the rod sections. Another keyway groove 51 may be provided for indexing the spacer clip 41 about the periphery of the joined rod sections. A pair of keys 53 in the resilient spacer clip 41 mate with longitudinal grooves 47 and 51 in the rod sections and hold the grooves in axial alignment, thereby preventing the joint 39 between rod sections from becoming accidentally disassembled. The spacer clip 41, shown in FIGURES 2 and 3, is a molded plastic piece that includes a central barrel section 55 which is slotted at 57 so that the barrel section may be expanded for slipping it over the section ends. A pair of wing-like members 59 protrude from the barrel section at about a 30° angle with respect to a diameter passing through the pair of keys 53. The spacer clip 41 is retained in axial position over the assembled joint by the shoulders 61 formed on the section ends by the short length of reduced diameter. Thus, as shown in FIGURES 2 and 3, the spacer clip 41 locks together the ends of rod sections and also serves as a spacer for centering the probe and inserter rod in the available space around a cable 65 within a duct 67. Where a lot of space is available within the duct 67, the spacer clips 41 may be alternated to form an X-like support in end view for the probe and inserter rod. Where less space is available within the duct 67, the spacer clips 41 may all be arranged on the side of the rod and probe facing the cable so that in either configuration no metallic object touches the cable to scratch the sheath or to make contact with it. The wing-like protrusions 59 of the spacer clip 41 also serve as finger grips for expanding the central slotted barrel portion and have leading and trailing edges that are angled back toward the center to permit them to pass readily in either direction over obstructions in the duct.

Therefore, the ultrasonic transducer of the present invention is sealed from contaminants that may be present in a cable duct and includes a diaphragm which forms a portion of the cylindrical walls of the probe. The probe may be positioned within a cable duct at the end of one or more attachable sections of an inserter rod which also carry and protect a fixed length of coaxial line attached to the probe transducer. Spacer clips at the joints of rod sections lock the joints together and also center the probe and inserter rod within the space about a cable within a duct.

We claim:

1. Signal apparatus comprising:
   an elongated probe for producing electrical signals in response to a selected physical condition;
   an elongated inserter rod attachable to said probe and carrying an elongated groove therein;
   said inserter rod including a plurality of sections, each section having means at an end thereof for mating and interlocking with an end of another section in groove aligning relationship;
   a spacer clip including a barrel portion disposed over the mating ends of sections of said inserter rod and including a key disposed within the groove in each of the mating sections for maintaining the same in axial alignment;
   a plurality of protrusions from said barrel portion disposed thereabout at an angular spacing less than 180°;
   a utilization circuit; and
   at least one continuous conductor carried within said groove and connecting said probe and said utilization circuit.

2. Probe apparatus comprising:
   a probe for producing electrical signals in response to a selected physical condition;
   an inserter rod attached to said probe for inserting said probe into an elongated duct and comprising a plurality of joinable sections;
   each section including a longitudinal groove and having ends of complementary inverse and interlocking cross section for sliding together in a direction transverse to the longitudinal axis of said sections to form an interlocking joint in groove-aligning relationship with a mating end of an adjacent section;
   a spacer clip having a split barrel portion disposed about the joint between adjacent sections;
   a longitudinal key in said barrel portion disposed within said groove for maintaining the grooves in adjacent sections axially aligned;
   a pair of wing-like protrusions from said barrel portion spaced away from the split in said barrel portion and angularly spaced thereabout at an angle less than 180°;
   whereby said spacer clip locks the joint formed between adjacent sections and spaces the inserter rod away from the boundaries of said elongated duct.

References Cited

UNITED STATES PATENTS

| | | | |
|---|---|---|---|
| 1,978,920 | 10/1934 | Van Deventer et al. | 179—115 X |
| 2,207,281 | 7/1940 | Athy et al. | 73—152 X |
| 2,651,027 | 9/1953 | Vogel | 340—18 |
| 2,854,844 | 10/1958 | Howell | 73—362 X |
| 2,886,794 | 5/1959 | Stedman et al. | 340—14 X |
| 3,018,466 | 1/1962 | Harris | 340—8 |
| 3,168,824 | 2/1965 | Florer et al. | 73—40.5 |
| 3,266,296 | 8/1966 | Hall | 73—40 |

LOUIS R. PRINCE, *Primary Examiner.*

J. NOLTON, *Assistant Examiner.*